Feb. 11, 1947.  J. W. SIMMONS  2,415,540
FASTENER
Filed May 5, 1944
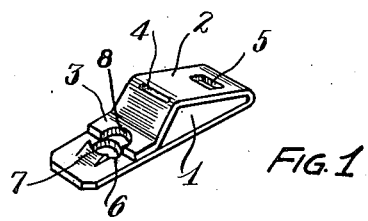
FIG. 1
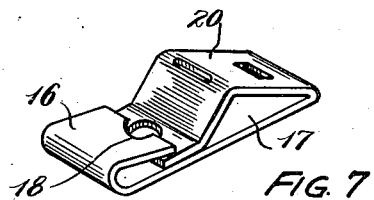
FIG. 7
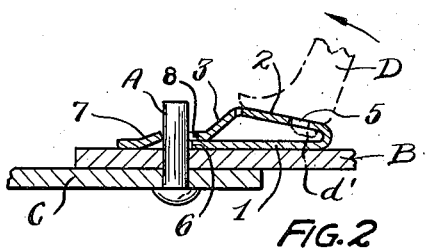
FIG. 2
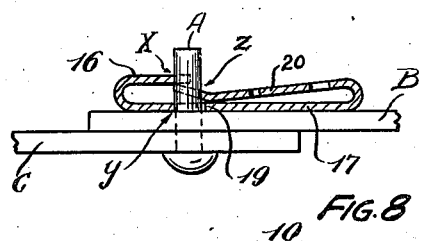
FIG. 8
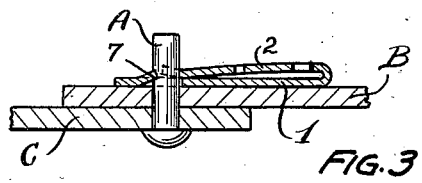
FIG. 3
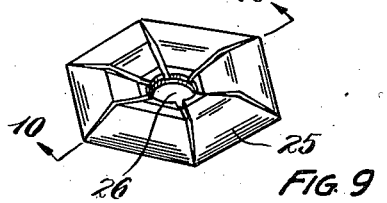
FIG. 9
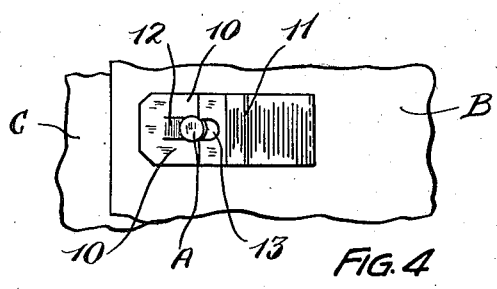
FIG. 4
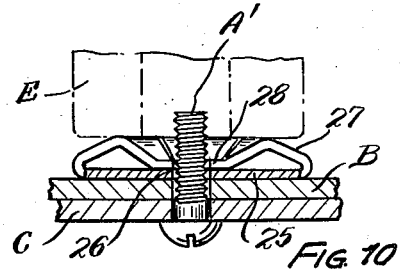
FIG. 10
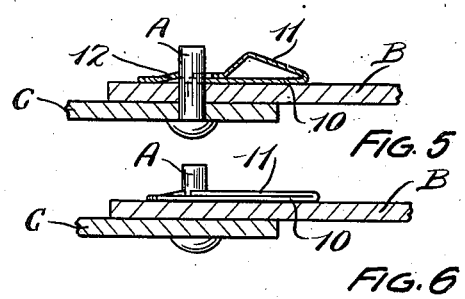
FIG. 5
FIG. 6
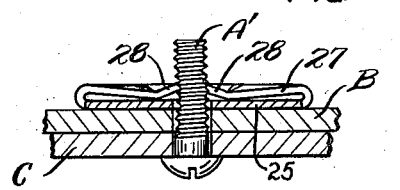
FIG. 11
INVENTOR.
John W. Simmons
BY
Hull & West
ATTORNEYS

UNITED STATES PATENT OFFICE 2,415,540

FASTENER

John W. Simmons, Cleveland Heights, Ohio

Application May 5, 1944, Serial No. 534,242

15 Claims. (Cl. 85—36)

This invention relates to the class of fasteners that are intended for quick application to studs, screws, or similar so-called entering elements which may be composed of metal, plastic or other suitable material. In the case of studs or their equivalents, while the same may be serrated, circumferentially grooved, or corrugated to prevent slippage of the fastener thereon, a principal object of my invention is to provide a fastener that will assume a very secure hold upon a smooth stud or similar entering element and retain such hold against loosening from vibration or shock.

A further object of the invention is to provide a simple and relatively inexpensive yet highly efficient fastener that is convenient of application to an entering element, and which, by a simple manipulation, is caused to firmly grip the latter and desirably embed its holding parts within said element thereby to insure against loosening of the connection of which the fastener forms a part.

Another object of the invention is to provide a fastener of the above mentioned class that will impose a clamping or biting action on the entering element in a direction substantially normal to the axis of the latter and at the same time exert a pull on the element in an axial direction so as to place the element under tension.

Other objects and advantages additional to the foregoing will appear as I proceed to describe the several embodiments of the invention illustrated in the accompanying drawing wherein Fig. 1 is a perspective view of one form of my invention; Fig. 2 is a sectional view showing the fastener of Fig. 1 in association with an entering element and two members that are held together thereby, the view including, in dot-and-dash lines, a part of a tool by which the fastener is adapted to be compressed; Fig. 3 is a view, similar to Fig. 2, showing the fastener compressed and, accordingly, in effective condition; Fig. 4 is a plan view, Fig. 5 a longitudinal section, and Fig. 6 a side elevation, of a form of the invention that is intended to be made of thin tough steel for use with an entering element of relatively softer material into which the element engaging part of the fastener cuts when the fastener is compressed, said views including the entering element and the members that are connected together thereby; Fig. 7 is a perspective view of a further modification of the invention; Fig. 8 shows the fastener of Fig. 7 in central longitudinal section and as applied to an entering element connecting two members together, the fastener being shown in effective condition; Fig. 9 is a perspective view of a nut-like embodiment of the invention; Fig. 10 is a transverse section through the same, as on the line 10—10 of Fig. 9, with the fastener in relaxed condition as when first applied to a screw by which two members are shown held together, the view including, in dot-and-dash lines, a tool by which the fastener is adapted to be compressed, and Fig. 11 is a view, similar to Fig. 10, showing the fastener compressed and in effective condition.

In all views of the drawing wherein it appears, up to and including Fig. 8, the entering element is designated A, while in Figs. 10 and 11 it is designated A'; and the members that are held together by the entering element are designated B and C.

Describing first that form of the invention illustrated in Figs. 1 to 3, the fastener is made of a strip of sheet metal of suitable length and width that is bent transversely about midway of its ends to provide a flat base 1 and a tongue 2, the latter being turned back over the base and buckled intermediate its ends so that upon being compressed its effective length is increased. In the initial form of the fastener, the inner end portion 3 of the tongue preferably lies flat against the base. Adjacent its high part or hump, the buckled portion of the tongue is desirably perforated or otherwise treated at 4 to define a bending line, and near its hinge-like connection with the end of the base, the tongue is provided with an opening 5 for the reception of a hook $d'$ on a tool D by which the tongue is adapted to be depressed and thus rendered effective, as will hereinafter appear.

The base 1 has an aperture 6 for the passage of the entering element A, and on the side of said aperture remote from the tongue 2, the material of the base is displaced upwardly to provide an abutment 7 that is in opposed relation to the end portion 3 of the tongue 2. Said end portion is shown as provided with a notch 8 that is less in width than the diameter of the aperture 6 and desirably equal to or slightly less than the diameter of the entering element A.

In the use of this form of the invention in the environment illustrated, the entering element is inserted through aligned holes in the members B and C, and the fastener is then engaged over the shank of said element, as shown in Fig. 2. With the parts thus assembled, the tongue 2 is depressed. This may be accomplished in any desired manner, as by projecting the hook $d'$ of the tool D through the opening 5 and swinging the tool in the direction of the arrow in Fig. 2.

The depression of the tongue produces a sort of toggle action that increases the effective length of the tongue and causes its inner end portion 3 to be forced into very firm contact with the entering element, at the same time creating a tendency therein to rock in a direction to exert a pull on said element and more securely bind the members 2 and 3 together between the fastener and the head of the element.

The form of the invention illustrated in Figs. 4 to 6 is quite similar to that above described, the base being designated 10, the tongue 11, and the abutment that is formed by a displaced portion of the base, 12. The notch 13 of the tongue 11 is less in width than the diameter of the entering element A.

It is intended that the metal from which this form of the invention is constructed shall be thin and tough relative to the material of the entering element A so that when the tongue is depressed by the application of pressure thereto or is driven down by means of a hammer or the like so as to impart to the tongue the toggle action already referred to, the edges of the tongue on opposite sides of the notch 13 will cut into the sides of the entering element and accordingly assume a positive interlocking engagement therewith in addition to the clamping of said element between the abutment 12 and the opposed edge of the tongue 11 at the inner end of the notch 13.

The form of the invention illustrated in Figs. 7 and 8 differs from the first described form by the substitution, for the abutment 7, of an abutment designated 16 that is produced by turning one end of the strip from which the fastener is constructed over the adjacent end of the base 17, said abutment being shown as provided with a shallow notch 18 which, in the original condition of the fastener, desirably slightly overhangs the aperture 19 of the base 17 through which the entering element A is adapted to be projected. Originally, the abutment 16 is inclined inwardly and slightly downwardly toward the base, as shown in Fig. 7, its inner end being spaced from the base a distance substantially equal to the thickness of the strip of material so that the flat end of the tongue 20 has a sliding fit between the abutment and the base. However, when the fastener is applied to an entering element and the buckled portion of the tongue is depressed toward the base, as shown in Fig. 8, the adjacent end portion of the tongue will rock upwardly, exerting a pull on the entering element and at the same time lifting slightly the overhanging end of the abutment, thereby forcing it more or less into parallel relation with the base and at the same time shortening the effective distance between the axis of the entering element and the bending line of the hinge-like connection between the abutment and the base, such condition having the effect of placing the abutment under compression and thus increasing its lateral thrust against the entering element in opposition to that exerted by the tongue 20. In the final effective condition of the fastener, it has a three-point contact, so to speak, with the entering element at one side, by the abutment 16 at the point indicated by the arrow *x* and by the edge portion of the base adjacent one side of the aperture 19 at the point *y*, which are spaced apart longitudinally of the entering element, and on the opposite side, at an intermediate point *z* by the tongue 20.

In the embodiment of the invention illustrated in Figs. 9 to 11, the fastener assumes somewhat the character of a nut. It is formed from a sheet metal blank and comprises a base 25, having a central aperture 26, and tongues 27 that are turned inwardly over the base and whose inner end portions 28 surround said aperture and engage the base a suitable distance outwardly from the aperture. The parts of the tongues intermediate their hinge-like connections with the periphery of the base and their inner end portions 28 are buckled or offset upwardly from the base, as illustrated in Figs. 9 and 10. In the latter view the fastener is shown as engaged over the threaded shank of the entering element A', which may consist of a standard bolt or screw, said element being projected through holes in the members B and C that are to be clamped between the head of said element and the fastener. With the parts assembled as described, the tongues 27 are compressed, as by means of a suitable tool E. Fig. 11 shows the tongues of the fastener compressed to the point of contact throughout the major portion of their lengths with the base 25, the inner end portions 28 of the tongues tending to rock slightly in a direction away from the base and thereby exert a pull on the entering element so as to more firmly clamp the members B and C between the head of said element and the fastener.

So great is the pressure resulting from the toggle action in the compression of the tongues that the threads of the entering element are embedded in the ends of the tongues, thereby to create a threaded engagement between the entering element and the fastener. By reason of this, the fastener may be removed by turning it in an appropriate direction with respect to the entering element. While the base 25 might be made circular and the metal drawn in the formation of the tongues so as to make the outer ends of the tongues curved according to the periphery of the base, the base is desirably polygonal, one of hexagonal formation being shown in the drawing with a tongue 27 turned inwardly from each face of the base.

A plurality of these fasteners may be applied to a screw or bolt and thus a nut-like structure of desired thickness built up, simply by compressing one fastener after another on the entering element. Also, having in mind an individual fastener of this style, one pair of opposed tongues may first be depressed and thereby caused to exert a pull on the entering element, then the second pair, and finally the third, resulting in three distinct thrusts being imparted to the entering element.

It will be understood that the several forms of the invention herein disclosed may be used interchangeably with threaded and unthreaded entering elements; and any of the embodiments may be very effectively employed as a nut lock by applying the fastener to the threaded end of a bolt or screw, outwardly beyond a nut, and compressing it firmly against the nut. This use of the fastener will be so readily understood from this description that illustration of such use is deemed unnecessary.

Having thus described my invention, what I claim is:

1. A fastener comprising a base having an aperture for the passage of an entering element, and a tongue having a hinge-like connection at its outer end with a peripheral portion of the base and extending inwardly over the base with its inner end portion substantially flat and in contact with the base adjacent said aperture, the part of the tongue intermediate said portion and its outer end being buckled so that upon its being pressed toward the base the effective length of the tongue is increased and its inner end forced into holding engagement with the entering element.

2. A fastener in accordance with claim 1 wherein a part of the base is displaced at one side of said aperture so as to provide an abutment that is in opposed relation to the inner end portion of said tongue.

3. A fastener in accordance with claim 1 wherein said tongue is provided with a tool receiving opening intermediate its hinge-like connection with the base and said inner end portion.

4. A fastener comprising a base provided with an aperture for the passage of an entering element, and a tongue having hinge-like connection at its outer end with a peripheral portion of the base and whose inner end portion is substantially flat and arranged for contact with the base at one side of said aperture, the portion of the base on the opposite side of said aperture constituting an abutment, the part of the tongue intermediate said flat portion and its connection with the base being buckled and at its high part being treated to define a bending line.

5. A fastener in accordance with claim 4 wherein said tongue is provided with a tool receiving opening intermediate said bending line and the connection of said tongue with the base.

6. A fastener comprising a base having an aperture for the passage of an entering element, and a tongue having a hinge-like connection at its outer end with a peripheral portion of the base and extending inwardly over the base with its inner end portion shaped for rocking and sliding engagement with the base adjacent said aperture, the part of the tongue intermediate said end portion and its hinge-like connection with the base being buckled so that upon said part being pressed toward the base the effective length of the tongue is increased and its inner end portion is forced into holding engagement with the entering element and is rocked in such manner as to exert a pull on said element.

7. In combination, an entering element, and a fastener for use therewith constructed of thin sheet metal relatively harder than the material of said entering element and consisting of a base having an aperture for the passage of the entering element, and a tongue having hinge-like connection at its outer end with a peripheral portion of the base and whose inner end portion is substantially parallel to the base and arranged for contact therewith adjacent one side of said aperture, the part of the tongue intermediate said inner end portion and its connection with the base being buckled, said buckled part being adapted to be flattened against the base so as to increase the effective length of the tongue and cause its inner end portion to embed itself into the material of said entering element.

8. A fastener in accordance with claim 7 wherein said inner end portion of the tongue is provided with a notch for the reception of the entering element and which notch is of less width than the diameter of the entering element.

9. A fastener constructed of an elongate strip of metal and consisting of a base having an aperture for the passage of an entering element, a tongue having integral hinge-like connection at its outer end with one end of the base and extending over the base and having its inner end portion substantially parallel to and arranged for contact with the base adjacent one side of the aforesaid aperture, the part of the tongue intermediate said portion and its connection with the base being buckled, and an abutment consisting of a part of said strip that is turned inwardly over the end of the base opposite that wherewith the outer end of the tongue has connection and having its inner end arranged for engagement with the adjacent side of an entering element projected through the aforesaid aperture.

10. A fastener constructed of an elongate piece of sheet metal and comprising a base provided with an aperture for the passage of an entering element, a tongue having integral hinge-like connection with one end of the base and extending inwardly over the base in spaced relation thereto and thence toward the base and finally having its inner end portion substantially parallel to the base and arranged for contact therewith at one side of the aforesaid aperture, said inner end portion having a notch for the reception of an entering element projected through the aforesaid aperture when the body portion of the tongue is depressed toward the base and the effective length of the tongue thus increased, and an abutment consisting of a part turned inwardly over the end of the base opposite that to which the tongue is connected, said part being inclined inwardly and downwardly toward the base and overlying the aforesaid end portion of the tongue, the abutment being provided with a notch that is substantially in register with the aperture of the base.

11. A fastener comprising a base having an aperture for the passage of an entering element, and tongues having hinge-like connections at their outer ends with the periphery of the base and extending inwardly over the base, the inner end portions of the tongues being arranged for contact with the base adjacent the aforesaid aperture, the parts of the tongues intermediate said inner end portions and their connection with the base being buckled whereby, upon the tongues being compressed toward the base, their inner ends will be moved radially of said aperture for engagement with an entering element projected through said aperture.

12. A fastener comprising a base having a substantially central aperture for the passage of an entering element, and tongues having integral hinge-like connection at their outer ends with the periphery of the base and extending inwardly over the base, the inner end portions of the tongues being substantially parallel to and arranged for contact with the base adjacent the aforesaid aperture, the parts of the tongues intermediate their inner end portions and their connection with the base being buckled whereby, upon the tongues being compressed toward the base, their inner ends will be moved radially of said aperture for engagement with an entering element projected through said aperture, said inner end portions of the tongues tending to rock away from the base as the aforesaid parts of the tongues are compressed.

13. A fastener comprising a polygonal base having a substantially central aperture for the passage of an entering element, and a plurality of tongues, each having an integral hinge-like connection at its outer end with one of the peripheral faces of the base and extending inwardly over the base and having its inner end portion arranged for contact with the base adjacent the aforesaid aperture, the part of each tongue intermediate its inner end portion and its connection with the base being buckled whereby, upon the tongue being compressed toward the base, its inner end will be moved radially of the aperture for engagement with an entering element projecting through said aperture, the inner end portion of the tongue tending to rock away from the base as the aforesaid part is compressed.

14. A fastener constructed of a single piece of sheet metal and comprising a hexagonal base having a substantially central aperture for the passage of an entering element, and six substantially triangular tongues, each extending from a peripheral face of the base radially inwardly over the base and having its inner end portion arranged for contact with the base adjacent the aforesaid aperture, the part of the tongue intermediate said end portion and its connection with the base being buckled, whereby, upon the tongue being compressed toward the base, its inner end will be moved radially of the aperture for engagement with an entering element projected therethrough.

15. A fastener comprising a base having a void for the passage of an entering element, and a contracted holding part having one end operatively connected to the base and adapted through deformation resulting in an extension of said part to assume holding engagement with an entering element projected through the aforesaid void, said holding part being formed to rock on the base in juxtaposition to the element whereby said part is caused to exert a pull on the element in a direction substantially normal to the plane of the base.

JOHN W. SIMMONS.

REFERENCES CITED

The following references are of record in the file of this patent:

UNITED STATES PATENTS

| Number | Name | Date |
|---|---|---|
| 593,221 | Howell et al. | Nov. 9, 1897 |
| 1,142,607 | Myer et al. | June 8, 1915 |
| 615,139 | Chambers | Nov. 28, 1898 |
| 1,095,889 | Kleese | May 5, 1914 |